May 22, 1956      T. C. HEATH      2,747,106
GENERATOR REGULATION
Filed July 23, 1953
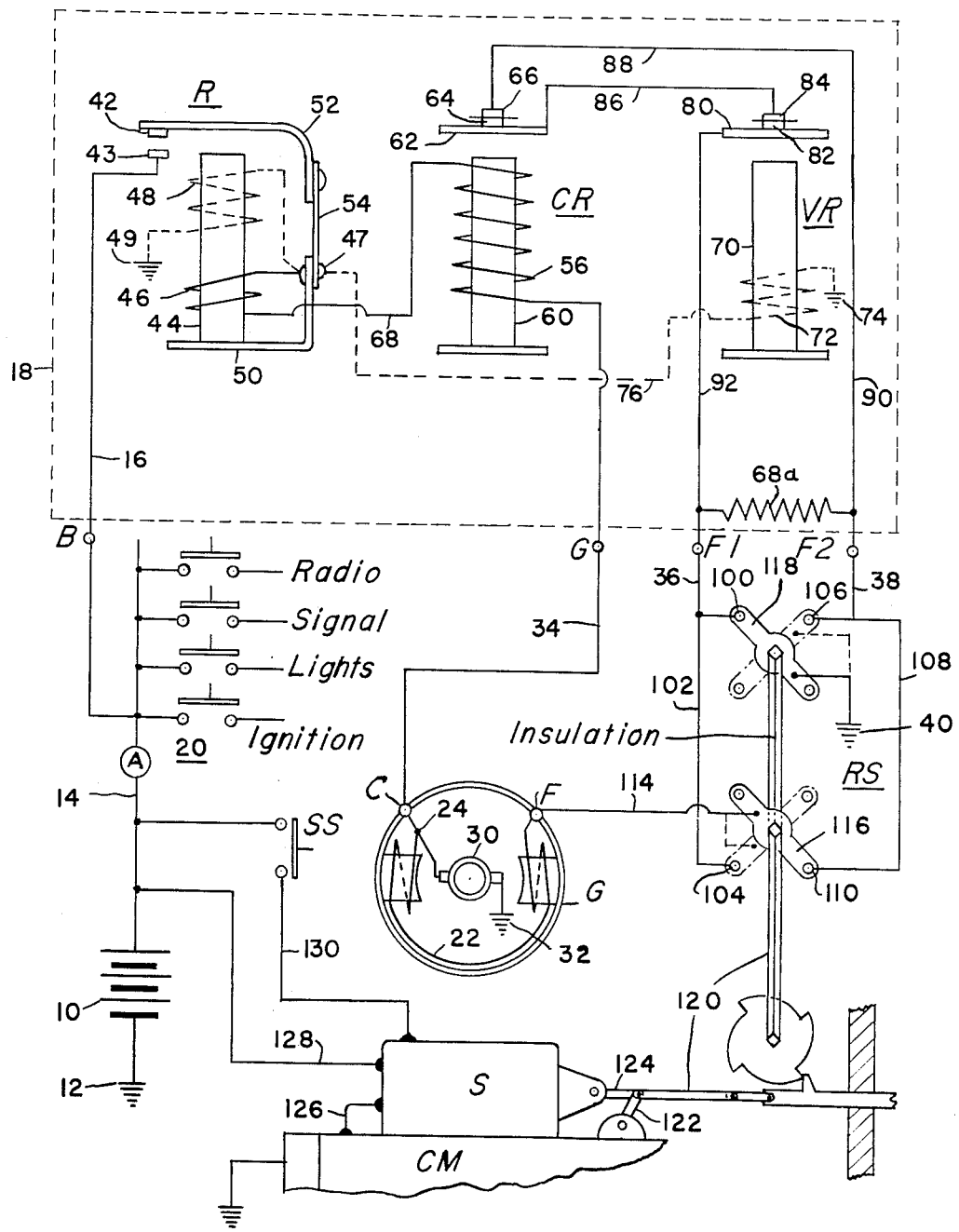
INVENTOR.
Thomas C. Heath
BY
Attorney

United States Patent Office 2,747,106
Patented May 22, 1956

2,747,106
GENERATOR REGULATION

Thomas C. Heath, Anderson, Ind., assignor to General Motors Corporation, Detroit, Mich., a corporation of Delaware Application July 23, 1953, Serial No. 369,887

5 Claims. (Cl. 290—36)

This invention relates to electrical systems and more particularly to generator regulation for a battery charging system where a storage battery is maintained in condition of sufficient charge to operate electrical devices used in a motor vehicle.

A motor vehicle is provided with an operation circuit, such as an ignition system, which is necessary to the operation of a motor vehicle engine. There may be one or more accessory circuits that are selectively operable when connected to the same storage battery. One of these accessory circuits may be a cranking circuit passing through a starting motor for occasionally starting the engine, that when started is connected to the operational circuit. There may be other accessory circuits such as a solenoid control for closing the circuit to the starting motor, as well as circuits for radio, signal devices, headlights and heaters, all of which depend for their operation upon the supply of energy from the battery. Thus, the load placed upon the storage battery is considerable, and may vary from the operational circuit alone to include practically all of the accessory circuits. The generator to be satisfactory must be able to supply enough energy to assist the battery in handling the load, and at the same time must have its output under control in its connections to the battery, without overcharging the same, and not permit the battery to become exhausted before recharging is effected.

Where the generator charge is controlled by rapid opening and closing of the contacts in the generator field circuit, there is apt to be arcing and burning of the contacts as the field circuit is opened and closed. Though resistors are alternately cut into and out of the field circuit, the continued opening and closing of regulator contacts tends to result in deterioration of contact material on one contact and the build up of contact material on the other. It is, therefore, found advisable to reverse occasionally the current flow through these contacts so that the transfer of the contact material from one contact to the other will be reversed with the result that the contacts will be suitable for use over a much longer period of time.

Solution of the problem has been effected by connecting into the ground circuit of the generator field winding, a reversing switch, from one side of which electrical connection is made through an energizing coil in series with the regulator contacts and return connections to the reversing switch. The field winding and ground connections are so connected that upon operation of the reversing switch the current flow through the contacts of the regulator can be reversed. A mechanical linkage between the reversing switch and some devices occasionally operated will suffice to change the direction of current flow and thereby prolong the life of the regulator contacts. As an example, linkage may connect the reversing switch to a movable part of a starting motor control, such as a solenoid switch. Even though the starting motor switch is started only once a day, there is thence provided means for reversing the current flow through the regulator contact once a day. It is obvious that the reversing switch might be changed by other occasionally operated devices that would satisfy the same end.

Further objects and advantages of the present invention will be apparent from the following description, reference being had to the accompanying drawings wherein a preferred embodiment of the present invention is clearly shown.

In the drawings:

The single figure of the drawing is a circuit diagram of a regulated system of control for a generator charging a storage battery with means inserted in the generator field circuit to prolong the life of regulator contacts.

With reference to the drawing, 10 refers to a battery grounded at 12 and connected by 14 through an ammeter A and conductor 16, with a generator G having a regulator 18 for control of several circuits including an operational circuit 20 and a plurality of accessory circuits such as indicated. The generator G has a field circuit 22 connected with a pole F of the generator, and connected at 24 as a shunt winding to an armature coil 30 grounded at 32 and connected with a terminal C which is connected by a conductor 34 to the control devices within the regulator generally indicated at 18.

The regulator in general comprises a relay R, a current regulator CR, and a voltage regulator VR, conductors 36 and 38 leading therefrom to a reversing switch RS connected between ground 40 and the terminal F of the generator.

The cutout relay R closes the generator to battery circuit through a pair of normally open contacts 42 and 43 when the generator voltage is sufficient to charge the battery, and it opens the circuit when the generator slows or stops. The relay has two windings assembled on a core 44, a series winding 46 of a few turns of heavy wire and a shunt winding 48 of many turns of fine wire. The shunt winding 48 grounded at 49 and connected at 47 is shunted across the generator so that generator voltage is impressed upon it at all times. The series winding 46 is connected to the frame at 47 and is in series with the charging circuit so that generator output passes through it at all times.

The relay core and windings are assembled into a frame 50 having an armature 52 attached to the frame 50 by flexible hinge 54 so that it is centered just above the end of the core. The armature has one contact point 42 which is located just above a stationary contact 43. When the generator is not operating the armature contact 42 is held away from the stationary contact 43 by the tension of the spring 54.

When the generator voltage builds up to a value great enough to charge the battery, the magnetism induced in the relay windings 46 and 48 is sufficient to overcome the tension of spring 54 and pull the armature toward the core 44 so that the contact points 42 and 43 are closed, completing the circuit between the generator G and the battery 10. The current which flows from the generator to the battery passes through the series winding 46 in the proper direction to add to the magnetism holding the armature down with the contacts closed. When the generator slows down or stops, current begins to flow from the battery to the generator which reverses the direction that the current flows through the series winding 46, thus causing a reversal of the series winding magnetic field. The magnetic field of the shunt winding 48 does not reverse. Therefore, instead of helping each other, the two windings 46 and 48 now magnetically oppose one another so that the resulting magnetic field becomes insufficient to hold the armature 52 down to maintain the contacts 42 and 43 closed. The spring pulls the armature away from the core so that the points separate and opens the circuit between the generator and the battery.

Current regulator CR has a series winding 56 with a few turns of heavy wire which carries all the generator output. The winding core 60 is assembled into a frame hingedly supporting an armature 62 which supports the contact 64 cooperable with a fixed contact 66. When the current regulator is not operating, springs hold the armature away from the core so that the contacts 64 and 66 are closed. In this position the generator field circuit is completed to ground through the current regulator contact points in series with the voltage regulator contact points as will presently appear. The armature circuit is completed through conductor 34 to series winding 56, then through wire 68 and series coil 46 to frame 50 at 47.

When the load demands are heavy, as for example, when electrical accessories are turned on and the battery is in a discharge condition, the voltage may not increase to a value sufficient to cause the voltage regulator VR to operate. Consequently, generator output will continue to increase until the generator reaches the rated maximum, that is, the current value for which the current regulator is set. Therefore, when the generator reaches the rated output, this current flows through the current regulator winding 56, and creates sufficient magnetism to pull the armature of the current regulator down and open the contacts 64, 66. With these contacts open, resistance 68a is inserted into the generator field circuit as will presently appear, so that the generator output is reduced.

As soon as the generator output starts to fall off, the magnetic field of the current regulator winding 56 is reduced, spring tension pulls the armature up, closing the contact points which directly connect the generator field to ground as will presently appear. Output increases and the above cycle is repeated. The cycle continues to take place while the current regulator is in operation 150 to 250 times per second, preventing the generator from exceeding its maximum.

When the electrical load is reduced, that is, when some of the accessories are turned off, or when the battery comes up to charge, then the voltage increases so that the voltages regulator VR begins to operate and tapers off the generator output. This prevents the current regulator from operating. Either the voltage regulator or the current regulator operates at any one time, but the two do not operate at the same time.

The voltage regulator VR is a voltage limiting device that prevents the voltage from exceeding a specified maximum and reduces generator output to the value required for any particular condition of battery charge and electrical load. The voltage regulator VR has a shunt winding 72 consisting of many turns of fine wire assembled on a single core 70 grounded at 74 and connected by wire 76 to the point 47 on the cutout relay, which is therefore shunted across the generator G.

The windings and core are assembled into a frame, and an armature 80 hingedly attached to the frame extends over the end of the core 70. The armature has a movable contact point 82 engageable with a fixed contact 84 which is connected by strap 86 to the armature 62 of the current relay CR. When the voltage regulator is not operating, springs hold the armature away from the core so that the points 82 and 84 are closed, and the generator field circuit is completed through them and through the contacts 64, 66 of the current regulator CR. A lead 88 connects fixed contact 66 with the lead 38 connecting with the reversing switch RS and a conductor 92 connects armature 80 with lead 36 going to the reversing switch. When the generator voltage reaches the value for which the voltage regulator is adjusted, the magnetic field produced by the winding 72 overcomes the armature spring tension and pulls the armature down so that the contacts 82 and 84 open. This inserts resistance 68a into the generator field circuit so that the generator field current and voltage are reduced. Reduction of the generator voltage reduces the magnetic field of the regulator shunt winding 72. The opening of the regulator points 82 and 84 opens the regulator circuit so that the magnetic field is reduced sufficiently to allow the springs to pull the armature away from the core so that the contact points 82 and 84 again close. That directly grounds the generator field circuit so that the generator voltage and output increases. The above cycle of action again takes place and the cycle continues at a rate of 150 to 250 times per second, regulating the voltage to a constant value. By thus maintaining a constant voltage, the generator supplies varying amounts of current to meet the varying states of battery charge and electrical load.

The current and voltage regulators use a resistance 68a connected across the conductors 90 and 92 connected into the field circuit 36 and 38, and is therefore in parallel with the two sets of contacts 64, 66 of the current regulator, and 82, 84 of the voltage regulator. The resistance becomes connected in parallel into the generator field circuit when either the current regulator CR or the voltage regulator VR operates. The resistance 68a is a common resistor which is inserted in the field circuit when either the current or voltage regulator operates. The sudden reduction of field current occurring when either the current or voltage regulator contact points open, is accompanied by a surge of induced voltage in the field coils as the strength of the magnetic field changes. These surges are partially dissipated by the resistor 68a which prevents excessive arcing at the contact points 64, 66 and 82, 84.

When either the current regulator or the voltage regulator operate, that is, when either of them open and close their respective contacts at the rate of 150 to 250 times per second, there is a relatively high frequency vibration of armatures, or opening and closing of their respective contacts, and there is a tendency for the contacts to arc, burn out or become pitted. The field leads 88, 92 connecting with terminals of the reversing switch provide a reversible path by which the field winding 22 of the generator G may be connected to ground 40. Conductor 36 joins terminal 100 which is bridged by 102 to contact 104 and lead 38 connects to terminal 106 bridged by 108 to contact 110. Blade 116 connects by 114 to terminal F of generator G, and switch blade 116 is adapted to alternately engage terminals 104 and 110, while switch blade 118 is adapted to alternately engage contacts 100 and 106. A mechanical linkage 120 connects the blades 116 and 118 to a movable part 122 of some selectively operably device, such as cranking motor CM of the automobile. The cranking motor is operated by a solenoid switch S having a plunger or the like 124 for actuating the link 122. The cranking motor CM has electrical connection 126 with a solenoid switch S and by 128 to the battery 10. A control lead 130 and control switch SS provide for actuating the cranking motor CM. Every time the cranking motor is operated, the reversing switch RS is operated to reverse the direction of the field current from the generator through the normally closed contacts of the current regulator and voltage regulator so that the pitting or burning of the contact faces is reduced. In one instance, or in one position of the reversing switch, the field current flows from the terminal F through 114, 116, 104, 102 and 36 to terminal F1 and then by conductor 92 to armature 80, contacts 82, 84, strap 86, armature 62, contacts 64, 66, wire 88, terminal F2, wire 38, terminal 106, blade 118 to ground at 40. In the other position of the reversing switch, the field current passes from terminal F through 114, 116, 110, 108 and thence by 38 through contacts 66, 64, armature 62, wire 86, contacts 84, 82, and back through 36 to terminal 100 and blade 118, to ground at 40.

While the embodiment of the present invention as herein disclosed, constitutes a preferred form, it is to be understood that other forms might be adopted.

What is claimed is as follows:

1. In an electrical system for motor vehicles, the combination comprising; a starting motor, a battery for energizing an operational circuit, a generator for charging the battery, control means for regulating the transmission of energy between the battery and the generator, said control means including; a resistance in series with the field circuit of the generator, a relay in circuit with said generator and battery, a pair of normally closed contacts for said relay in parallel with said resistance and adapted when open to reduce the generator output by grounding the generator field through the resistance, means for reversing the direction of flow through said contacts to reduce contact deterioration, and means operable coincident with energization of said starter for actuating said reversing means.

2. In an electrical system for motor vehicles, the combination comprising, a battery for energizing an operational circuit and an accessory circuit, a generator for charging the battery, control means for regulating the transmission of energy between the battery and the generator, including normally closed contacts connected between ground and the field of said generator, a resistance connected in parallel with said contacts and adapted when said contacts are open to reduce the generator output, means responding to the output of said generator for opening said contacts, and means operable coincident with the operation of said accessory for reversing the direction of current through said contacts.

3. In an electrical system for motor vehicles, the combination comprising; a battery, a generator for charging the battery, control means for regulating the transmission of energy between the battery and the generator, said control means including a current regulator energized by said generator and having a pair of normally closed contacts, a voltage regulator having a pair of normally closed contacts in series with said current regulator contacts, means applying the output of said generator to the current regulator and to the voltage regulator, a pair of normally closed contacts controlled by each regulator which when open reduce the output of said generator, and means reversing the flow through said pairs of contacts coincident with the operation of a separate means having an intermittent operation.

4. In a battery charging circuit, the combination comprising, a generator having a field winding, a ground connection for the field winding of said generator, said ground connection including a magnetizing coil and a pair of normally closed contacts in series therewith, a resistance in parallel with said winding and said contacts, and an intermittently operated reversing switch for reversing the direction of flow through said normally closed contacts, said resistance when the contacts are open reducing the field current of said generator.

5. In an electrical system for motor vehicles including; a cranking motor and a battery charging system comprising; a storage battery, a D. C. generator having a shunt field, a relay in circuit with and responsive to the output of said generator, a pair of contacts for said relay connected in the field circuit of said generator and adapted to be opened and closed in response to the output of said generator, and a means operatively connected with said starter for actuating a switch means included in the field circuit of said generator for reversing the direction of current flow through said contacts each time the starter is energized.

References Cited in the file of this patent
UNITED STATES PATENTS

| | | |
|---|---|---|
| 1,298,728 | Jackson | Apr. 1, 1919 |
| 2,307,025 | Creveling | Jan. 5, 1943 |
| 2,312,669 | Nippert | Mar. 2, 1943 |